United States Patent [19]

Landrum et al.

[11] Patent Number: 4,616,854

[45] Date of Patent: Oct. 14, 1986

[54] INSURANCE FORM INDICIA SYSTEM

[76] Inventors: Van O. Landrum, P.O. Box 514, Moss Point, Miss. 39563; Hollis T. Landrum, First United Methodist Church, P.O. Box 72, Brandon, Miss. 39042

[21] Appl. No.: 755,344

[22] Filed: Jul. 16, 1985

[51] Int. Cl.$^4$ .......................... G09C 1/06; B42D 15/00
[52] U.S. Cl. .......................................... 283/74; 283/54
[58] Field of Search .................... 283/54, 72, 74, 900, 283/901; 235/435, 436, 454, 457

[56] References Cited

U.S. PATENT DOCUMENTS

| | | | |
|---|---|---|---|
| 1,634,240 | 6/1927 | Wilford | 283/54 |
| 2,235,259 | 3/1941 | Juhl | 283/54 |
| 3,406,467 | 10/1968 | Davis | 283/54 |
| 3,820,067 | 6/1974 | Shepard | 283/901 |
| 3,960,634 | 6/1976 | Kempster | 283/900 |
| 4,376,887 | 3/1983 | Greenaway et al. | 283/72 |
| 4,469,937 | 9/1984 | Stockburger et al. | 283/74 |

Primary Examiner—Paul A. Bell
Assistant Examiner—Paul M. Heyrana, Sr.
Attorney, Agent, or Firm—Barnes & Thornburg

[57] ABSTRACT

An insurance form carries first pattern areas into which data representing identify of an insurance claimant and identity of a health insurance company against which a claim form is entered and second pattern areas in which symbols are entered representing a state abbreviation, a congressional district of the state, a city of the congressional district, physician's classification as listed in a State Medical Directory, a number representing the total number of particular physicians in the physician's classification designation, a patient number which changes with every claim filed and an identification number of a health insurance company against whom the claim is filed.

6 Claims, 3 Drawing Figures

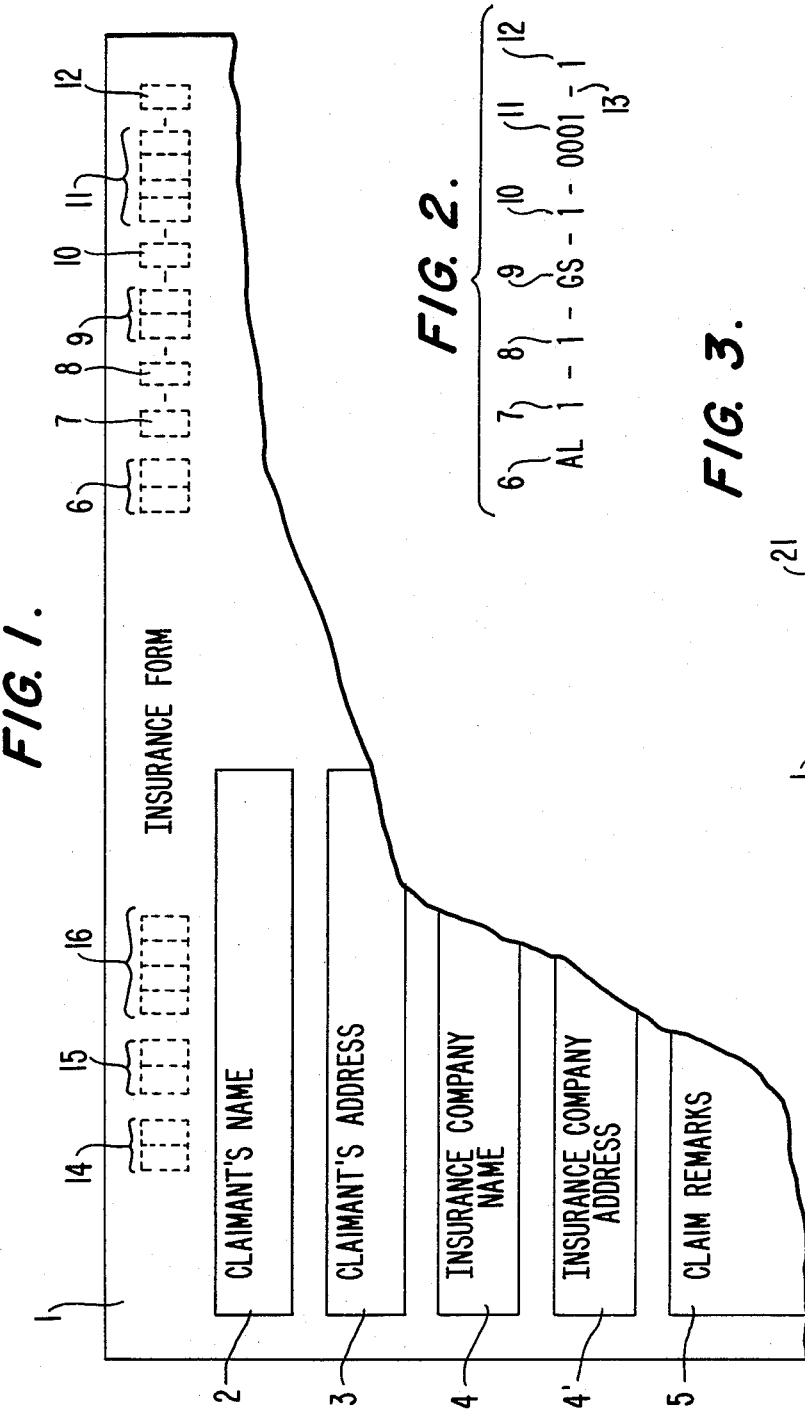

INSURANCE FORM INDICIA SYSTEM

BACKGROUND OF THE INVENTION

The increased use of medical insurance in payment for medical services in recent years has led to an attendant increase in labor of processing claims for medical insurance reimburesment, the cost being borne by the public and the medical establishment.

Further, a necessity for deriving statistical data for the use in improving public health, for instituting appropriate medical legislation and for calculation of insurance risks has led to a requirement for gathering statistical data from which informed judgment can be made in instituting improvements in public health, legislation and insurance.

THE INVENTION

The invention has for an object the avoidance of the difficulties present in the prior art gathering and processing of medical information.

Another object of the invention is to provide an insurance form, some portions of which may be sensed by electronic optical character recognition (OCR) equipment.

It is another object of the invention to provide an insurance form from which geographical localities pertinent to the claim and claimant may be electronically sensed for subsequent data processing.

It is another object of the invention to provide an insurance form from which data representing physician classification and the number of physicians for a particular classification may be electronically sensed.

It is another object of the invention to provide an insurance form from which data representing a patient number, which changes with every claim filed, may be electronically sensed.

It is another object of the invention to provide an insurance form from which data representing the identification of a health insurance company against whom claim is filed may be electronically sensed.

These and other objects, features and advantages of the present invention will become more apparent from the following description when taken in connection with the accompanying drawing which shows, for the purposes of illustration only, one embodiment in accordance with the present invention, and wherein:

FIG. 1 represents an insurance form according to the invention,

FIG. 2 shows an exemplary form of indicia to be electronically sensed, and

FIG. 3 represents a machine configuration by which an insurance form according to the invention may be processed.

Referring now to the drawings wherein like reference numerals are used to designate like parts and more particularly to FIG. 1, there is shown an insurance form 1 with designated pattern areas for entering a claimant's name 2, a claimant's address 3, name 4 and address 4' of a health insurance company against which a claim is being filed. Further details incident to the claim, for example in the form of remarks 5, may be filled in.

Pattern areas 2–5 are blank as the forms are prepared. Data is entered in pattern areas 2–5 by typewriters, word processor or the like.

A series of characters, symbols, which may take the form of digits and letters or the like, is affixed in other pattern areas to the insurance form 1.

As shown in FIG. 1, a two-digit configuration 6 is affixed to identify a particular state, for example, AL for Alabama.

A digit configuration at 7 identifies a particular Congressional District within the state identified at 6.

At 8, a digital configuration is affixed identifying a particular city within the Congressional District identified at 7.

It will be appreciated that the data entries of elements 6, 7 and 8 may correlate with the claimant's address set forth in element 3.

Thus, the state identified at 6 may be the state entered in claimant's address 3 for example. Alternatively, the state entered at 6 may be the state entered in the insurance company address at 4.

At 9, a physician's classification as listed in the State Medical Directory is designated.

At 10, the total number of particular physicians within the classification listed in the State Medical Directory designated at 9 is affixed.

Data elements in pattern areas 6–12 may correlate with that shown in pattern areas 2–5.

The data elements 9 and 10 may be correlated with the data entered at 6 and may bear some relationship to the data entered in elements 7 and 8, but in some instances may have no correlation to 6, 7 and 8.

Element 11 designates a multi-digit patient number which changes serially with every claim filed, that is, it is contemplated that no two forms 1 will have identical patient numbers 11 within any insurance claim system. Thus, in the situation where a single person files a plurality of claims, each claim relating to a different medical service performed, the person will be represented in the insurance bookkeeping system by three different patient numbers 11 as entered on three different forms 1. It may thus be said that the data entered on one or more forms 1 in position 11 will be correlated to the claimant and claimant's address present on the several forms at positions 2 and 3.

Similarly, data elements entered in pattern area 12 may correlate with data elements entered in pattern areas 4 and 4', and in an exemplary form may represent the company entered at 4 and 4'.

Data forms are generated by data processing equipment, not shown, the data processing equipment generating batches of forms, each batch having identical information for indicia 6–10. For example, the forms in a particular representative batch will carry data representing the same state, congressional district, city within the congressional district, physician's classification and number of physicians in the particular classification. Each insurance form within the batch would carry a different number in pattern area 11, which could, in an exemplary batch, be serially numbered from 0000 to 9999, as shown. For larger batches, a larger number of digits, of course, could be assigned to pattern area 11.

An identification number of a health insurance company against whom the claim is filed is entered by typewriter, word processor or the like, at position 12 and, as will be apparent, is correlated to the data entered in position 4 and 4'.

A principal criterion for the choice of configuration for the individual symbols used in pattern areas 6–12 is that each symbol be satisfactory in avoiding erroneous identification by the OCR sensing process. In practice symbols may be used for which OCR hardware and software are available in the marketplace.

While the specific digital representations in the pattern areas of positions 6–12 have been shown variously as having one, two or more digital positions, the artisan may find it expedient to a different number of digit or symbol positions for representing the data to be affixed as expediency may require. For example, patient numbers may exceed the ten thousand available numbers afforded by the four digit positions as shown or, alternatively, the number of digit positions necessary to appropriately represent physician classification in the State Medical Directory may require more or less numbers of digits than the two shown in the example of FIG. 1.

By the same token, it will be appreciated by the artisan that the position of the elements 6–12 need not be linear, as shown in FIG. 1. The elements may be located elsewhere on the form 1. Other positions on the form 1 for the elements 6–12 may be expedient for data input to a particular OCR equipment employed.

Similarly, elements 6–12, if presented in linear configuration, may be presented in a different serial order than that shown in FIG. 1 if found to be expedient by a person practicing the invention.

In another configuration for the elements 6–12, each of the elements may be disposed at any particular place on the form 1, for example, as the requirements of electronic character recognition may dictate. Thus, the State, Congressional District and City designations may be physically disposed adjacent the claimant's address 3. Alternatively, the identification of the health insurance company 12 may be located contiguous to element 4 or 4'.

Data elements may be entered in pattern areas 14, 15 and 16 representing day, month and year, respectively. A different order of presentation may, of course, be selected by the artisan if desired. The data in pattern areas 14, 15 and 16 represents a "Date Due" for payment, for example, a date which is in the future with respect to the date of entry for data in pattern areas 2–5, the date serving as a tickler file, possibly for use in filing systems where filing is manually performed. Data in pattern areas 14, 15 and 16 may thus have a correlation, or be correlated with data entered in pattern areas such as the remarks area 5 or the claim number area 11. The specific location for pattern areas 14, 15 and 16 may be that which is most expedient for identifying the documents in the particular filing system used.

FIG. 2 shows an exemplary notation of a character which might be used for elements 6–12 wherein the data elements represent the state of Alabama as element 6, the first Congressional District of Alabama in element 7, a numerical representation for a city in the first Congressional District as element 8, a designation GS, for example, General Surgery, as the physician's classification within the State Medical Directory as element 9, the total number of physicians in the particular classification as element 10, a multi-digit patient number designating a particular claim as element 11 and finally, an identification number for a particular health insurance company at reference numberal 12. Hyphens such as 13 are shown in FIG. 2 as separating the various data elements. The particular designation employed as shown by hyphens, is exemplary only. The artisan will recognize that other separating symbols may be used, or alternatively, a blank space may be interposed at 13.

In use, with one or more batches of forms with data entered in blocks 6–11 at hand, the claimant or person filling out the form will select a form based upon the circumstances relating to a particular claim, namely the state, congressional district, city in the congressional district, physician's classification and number of physicians, as per data elements for pattern areas 6–10, and will enter, by typewriter or word processor or the like, data representing the claimant's name, address, insurance company, insurance company address and claim remarks in blocks 2–4, 4' and 5 and will also enter a corresponding data entry in block 12 by the same means corresponding to the data entered in blocks 4 and 4'. The insurance form is then ready for OCR processing.

FIG. 3 shows a schematic diagram of apparatus for processing the form 1 with its data entries 6–12. The form 1 is caused to traverse a path, designated by the arrow 20, across the optical character recognition reader 21 during which traverse, reading elements 22 sense the symbol positions of elements 6–12 to generate electronic signals within the OCR reader 21 which are transmitted to a data processor 23.

While optical sensing of the pattern areas 6–12 has been described, practice of the invention by sensing other physical or electronic phenomena, for example magnetic, capacitive, resistive sensing, and other non-optical forms of radiation is contemplated.

By suitable programming well known to those skilled in the art, the several data of elements 6–12 may be logically correlated by means of data processor 23 to produce output at 24 either in electronic form or visual form, for example as a print out or on a cathode ray tube terminal.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. An insurance claim form comprising a plurality of first pattern areas including data representing identity of an insurance claimant and identity of a health insurance company,
    a plurality of second pattern areas including symbols sensible by optical character recognition technique,
    each second pattern area being spaced from all others of said second pattern areas so as to isolate the sensing of said each second pattern area from the sensing of all other second pattern areas in order to prevent erroneous sensing,
    said symbols carried in at least one of said second pattern areas being correlated in a predetermined manner with at least one datum entered in one of said first pattern areas,
    wherein at least one of said first pattern areas includes data corresponding to one of the insurance claimant's name, the insurance claimant's address, the name of a health insurance company against which a claim is filed, the address of a health insurance company against which a claim is filed.

2. An insurance form in accordance with claim 1, wherein at least one of the second pattern areas carries symbols representative of one of a state abbreviation, congressional district in said state, a city in said congressional district, a physician's classification as listed in a state medical directory, a number representing the total number of particular physicians in said physicians' classification, a patient number representing a particular insurance claim filed and an identification number of a health insurance company against which a claim is filed.

3. An insurance form in accordance with claim 2, wherein said first pattern areas contain data which is visually readable.

4. An insurance form in accordance with claim 3, wherein at least one of said second pattern areas carries symbols which are sensible only by electronic technique.

5. An insurance form in accordance with claim 3, wherein said second pattern areas carry symbols none of which are visually readable and which are sensible only by optical character recognition technique.

6. An insurance form in accordance with claim 4, further comprising
 a plurality of third pattern areas carrying symbols visually readable representative of a data which is future with respect to the date of data entry for data in the first pattern area.

* * * * *